(No Model.)
A. COURTOIS.
COMBINED MATCH SAFE AND CIGAR CUTTER.
No. 541,039. Patented June 11, 1895.
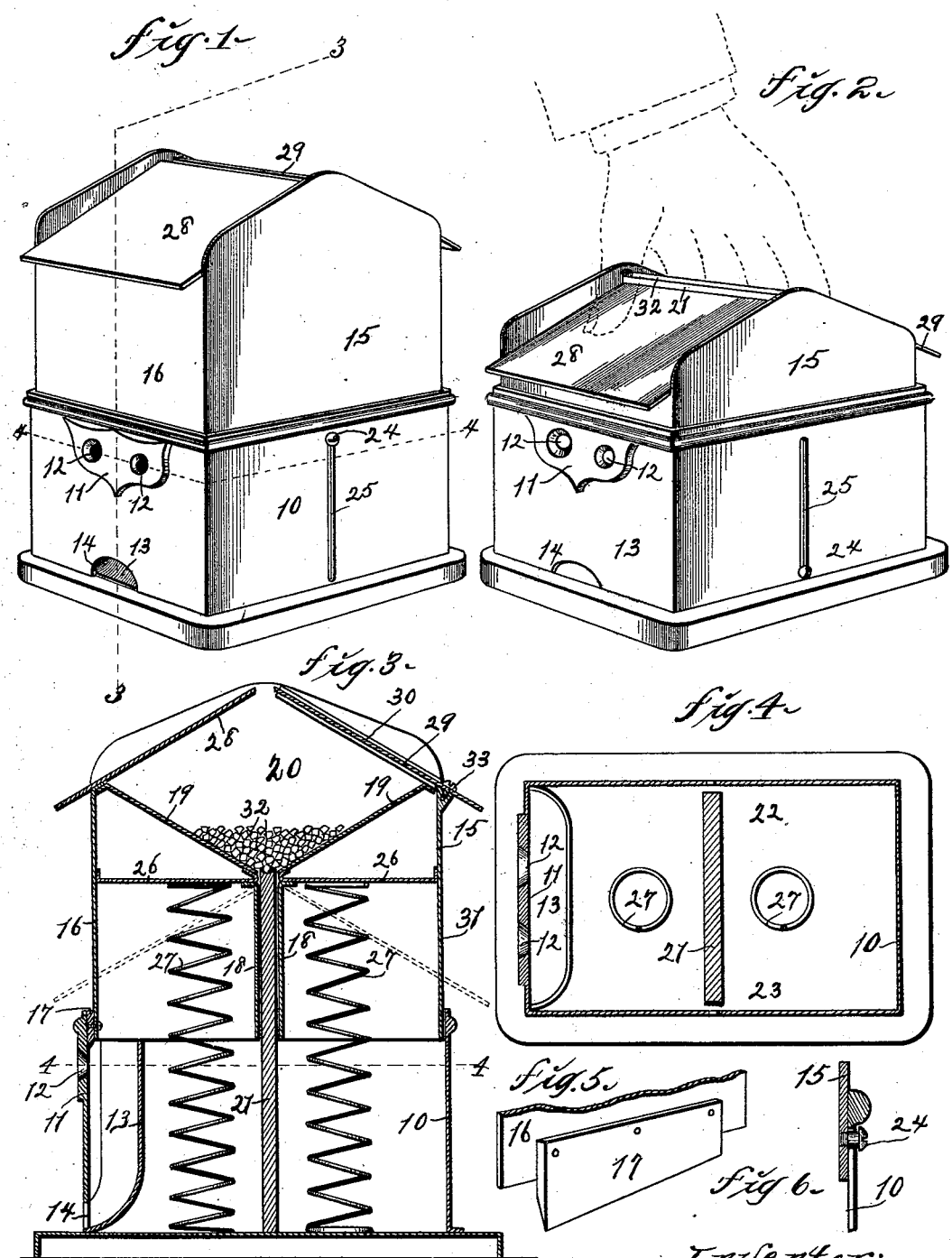
Inventor:—
Alphonse Courtois
By Higdon & Higdon & Longan
Attys
Attest:—
W. P. Smith
S. C. Sweet

UNITED STATES PATENT OFFICE.

ALPHONSE COURTOIS, OF ST. LOUIS, ASSIGNOR OF ONE-HALF TO ADOLPH LACHANCE, OF OSAGE, MISSOURI.

COMBINED MATCH-SAFE AND CIGAR-CUTTER.

SPECIFICATION forming part of Letters Patent No. 541,039, dated June 11, 1895.

Application filed April 16, 1894. Serial No. 507,655. (No model.)

*To all whom it may concern:*

Be it known that I, ALPHONSE COURTOIS, of the city of St. Louis and State of Missouri, have invented certain new and useful Improvements in a Combined Match-Box and Cigar-Cutter, of which the following is a full, clear, and exact description, reference being had to the accompanying drawings, forming a part hereof.

My invention relates to improved means for delivering one match at a time and for cutting the pointed ends from cigars, and it consists in the novel construction, combination and arrangement of parts, hereinafter described and claimed.

Referring to the drawings, Figure 1 is a perspective view showing the device at rest. Fig. 2 is a perspective view showing the device in operation. Fig. 3 is a sectional elevation on the line 3 3 of Fig. 1. Fig. 4 is a horizontal sectional view on the line 4 4 of Fig. 1. Fig. 5 is a perspective view of the cutting mechanism secured to the receptacle. Fig. 6 is a section illustrating the manner of connection of the casing and receptacle.

In the construction of the device as shown, the numeral 10 designates a casing having an open top, preferably rectangular in plan view, and provided in one of its sides with a portion 11 of increased thickness, in which portion 11 is formed a series of transverse countersunk apertures 12, which said apertures are of varying diameters.

Mounted within the casing 10, and approximately surrounding the apertures 12, is an angular partition 13, the lower end of which partition is curved and brought into rigid connection with that side of the casing within which the apertures are formed, and formed in the said side of the said casing, adjacent to the lower end of the said partition, is an aperture 14, a space existing between the sides of the partition 13 and the said sides of the said casing.

Vertically positioned within the casing 10, and adapted for reciprocation therein, is a receptacle 15, to the side 16 of which receptacle is attached a blade 17 adapted for reciprocation in alignment with the inner face of the apertured side of the casing 10 across the axial plane of the apertures 12.

Transverse partitions 18, 18, parallel with each other, are formed in the central portion of the receptacle 15, and leading obliquely, and in divergent planes, from the upper edges of the partitions 18, 18, are partitions 19, 19, which said partitions 19, 19, conjunctively with the ends and cover, provide a chamber 20, adapted to contain matches.

Rigidly secured to the bottom of the casing 10, and vertically extending therefrom in a central plane therein, is a standard 21, spaces 22, 23 existing between the ends of said standard and the ends of the said casing, the upper edge of said standard being concaved.

The ends of the casing 10 are vertically slotted, and pins 24, transversely seated in the end portions of the receptacle 15, are passed through, and adapted to travel in the said slots, the slots being indicated as 25.

Horizontally positioned within the receptacle 15, and fixed to the partitions 18, 18 and the sides of said receptacle, are partitions 26, 26, and expansive spiral springs 27, 27 are interposed between the lower surfaces of said partitions 26, 26 and the upper surface of the bottom of the casing 10, the resilience of said springs retaining the receptacle normally in the position shown in Figs. 1 and 3.

The cover of the receptacle 15 comprises a plate 28 arranged in an inclined plane, as shown, and leading from the top edge of the side 16, nearly to the central vertical plane of the standard 21, and rigidly connected to the ends and one side of said receptacle, and a plate 29 mounted in slide bearings 30 fixed to the ends of the receptacle, and leading from the top of the side 31 of said receptacle nearly to the central vertical plane of the standard 21. A slot is thus formed in the apex of the cover of the receptacle 15, through which matches 32 are removed, as hereinafter explained.

The plate 29 is rigidly, removably and replacably secured to the side 31 of the receptacle, by means of a screw 33, thereby providing means of access to the interior of the chamber 20.

In the practical use of this invention the operator having a cigar with a closed, tapered end, and desiring to smoke such cigar, inserts the end thereof into one of the apertures 12, and depresses the receptacle 15, by the application of manual force to the cover thereof, as shown in Fig. 2. The downward movement of the receptacle 15 causes the blade 17 to sever the inwardly projecting end portion of the cigar from the body portion thereof, and also carries the mass of matches below the plane of the upper edge of the standard 21, and, by reason of the cavity formed in the upper edge of said standard, one match will be retained therein and carried by the said standard through the slot in the cover, as shown in Fig. 2, in view of the operator and within convenient reach. The clipped end portion of the cigar falls within the space formed by the partition 13, and passes out through the aperture 14 into a receptacle provided therefor, and not shown.

Upon the release of the manual force from the cover of the receptacle 15, said receptacle resumes its normal position, by reason of the resilience of the springs 27, 27.

What I claim is—

The improved match-box and cigar cutter, comprising a fixed casing or base 10, a vertical partition or standard 21 having its lower end rigidly secured to the bottom of said casing and extending centrally entirely across the interior of the latter with one of its edges closely adjacent one side of said casing, and its opposite edge adjacent the opposite side thereof, the upper edge of said standard being concaved throughout its width, said sides of said casing having opposite vertical slots 25, a receptacle 15 having opposite vertical sides and mounted within the said casing for reciprocation therein, two vertical partitions 18 extending parallel entirely across and fixed upon the interior of said receptacle with a space between themselves, in which space said part 21 is located, whereby a central double guide for said receptacle is formed, two horizontal partitions 26, 26 connecting said parallel guide-partitions to said vertical opposite sides of said movable receptacle, two compressible springs 27, 27 mounted in the space below said horizontal partitions, one on each side of said standard 21, whereby the weight of the movable receptacle is balanced on each side of the machine, pins 24 transversely seated in the opposite walls of said receptacle and passing through said vertical slots in said casing, and a suitable cigar cutter connected to said casing, substantially as herein specified.

In testimony whereof I affix my signature in presence of two witnesses.

ALPHONSE COURTOIS.

Witnesses:
J. E. LOVE,
JNO. C. HIGDON.